(12) United States Patent
Kumei et al.

(10) Patent No.: US 11,139,490 B2
(45) Date of Patent: Oct. 5, 2021

(54) FUEL CELL SYSTEM

(71) Applicant: TOYOTA JIDOSHA KABUSHIKI KAISHA, Toyota (JP)

(72) Inventors: Hideyuki Kumei, Sunto-gun (JP); Masayuki Ito, Sunto-gun (JP); Tomohiko Kaneko, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 159 days.

(21) Appl. No.: 16/563,061

(22) Filed: Sep. 6, 2019

(65) Prior Publication Data

US 2020/0127307 A1   Apr. 23, 2020

(30) Foreign Application Priority Data

Oct. 22, 2018 (JP) .............................. JP2018-198436

(51) Int. Cl.
| | |
|---|---|
| *H01M 8/04* | (2016.01) |
| *H01M 8/04119* | (2016.01) |
| *H01M 16/00* | (2006.01) |
| *H01M 8/24* | (2016.01) |
| *H01M 8/04858* | (2016.01) |
| *H01M 8/04746* | (2016.01) |
| *H01M 8/04828* | (2016.01) |

(52) U.S. Cl.
CPC ... *H01M 8/04179* (2013.01); *H01M 8/04776* (2013.01); *H01M 8/04932* (2013.01); *H01M 8/04947* (2013.01); *H01M 8/24* (2013.01); *H01M 16/006* (2013.01); *H01M 2220/20* (2013.01); *H01M 2250/20* (2013.01)

(58) Field of Classification Search
CPC ......... H01M 8/04179; H01M 8/04776; H01M 8/04947; H01M 16/006
USPC .......................................................... 429/9
See application file for complete search history.

(56) References Cited

U.S. PATENT DOCUMENTS

| | | | |
|---|---|---|---|
| 2005/0164054 A1 | 7/2005 | Wheat et al. | |
| 2010/0119898 A1* | 5/2010 | Imai | H01M 8/04492 429/430 |
| 2010/0266911 A1* | 10/2010 | Aso | H01M 8/04228 429/427 |
| 2015/0318565 A1* | 11/2015 | Ryu | H01M 8/0488 429/430 |

(Continued)

FOREIGN PATENT DOCUMENTS

| | | |
|---|---|---|
| JP | 2005-209648 | 8/2005 |
| JP | 2006-155997 | 6/2006 |

*Primary Examiner* — James M Erwin
(74) *Attorney, Agent, or Firm* — Finnegan, Henderson, Farabow, Garrett & Dunner, LLP

(57) ABSTRACT

A fuel cell system includes: a secondary battery; first and second fuel cells; first and second scavenging devices configured to scavenge the first and second fuel cells, respectively; and a control device configured to perform a first scavenging process of scavenging the first fuel cell by driving the first scavenging device using a charged power of the secondary battery when the first and second fuel cells are in a power generation stopped state and to perform a second scavenging process of scavenging the second fuel cell by driving the second scavenging device using a generated power of the first fuel cell when the first fuel cell is in a power generation state and the second fuel cell is in the power generation stopped state.

5 Claims, 10 Drawing Sheets

(56) References Cited

U.S. PATENT DOCUMENTS

2016/0141896 A1* 5/2016 Brandon ............. H01M 16/003
                                                    307/72
2017/0352902 A1* 12/2017 Ojima ................... H02J 7/0077
2018/0166720 A1* 6/2018 Asano ............... H01M 8/04201

* cited by examiner

FUEL CELL SYSTEM

The disclosure of Japanese Patent Application No. 2018-198436 filed on Oct. 22, 2018 including the specification, drawings and abstract is incorporated herein by reference in its entirety.

BACKGROUND

1. Technical Field

The disclosure relates to a fuel cell system.

2. Description of Related Art

When liquid water remains in a fuel cell, the liquid water may freeze in the fuel cell after power generation of the fuel cell has been stopped and flow of a reactant gas may be hindered at the time of next starting. Therefore, a technique of scavenging a fuel cell to discharge liquid water from the fuel cell when the fuel cell stops power generation is known (for example, see Japanese Unexamined Patent Application Publication No. 2006-155997 (JP 2006-155997 A)). Such scavenging is performed based on charged power in a secondary battery other than the fuel cell.

SUMMARY

Charged power in a secondary battery cannot be said to be always sufficient. The output performance of the secondary battery may decrease in an environment of a low temperature. In a fuel cell system including a plurality of fuel cells, there is a likelihood that charged power in a secondary battery will be not sufficient to satisfactorily scavenge the plurality of fuel cells.

The disclosure provides a fuel cell system that can satisfactorily scavenge a plurality of fuel cells.

According to a first aspect of the disclosure, there is provided a fuel cell system including: a secondary battery; first and second fuel cells; first and second scavenging devices configured to scavenge the first and second fuel cells, respectively; and a control device configured to perform a first scavenging process of scavenging the first fuel cell by driving the first scavenging device using a charged power of the secondary battery when the first and second fuel cells are in a power generation stopped state and to perform a second scavenging process of scavenging the second fuel cell by driving the second scavenging device using a generated power of the first fuel cell when the first fuel cell is in a power generation state and the second fuel cell is in the power generation stopped state.

According to this configuration, only the first fuel cell is scavenged using the charged power of the secondary battery only when both the first and second fuel cells are in the power generation stopped state, and the second fuel cell is scavenged using the generated power of the first fuel cell when only the first fuel cell is in the power generation state. In this way, since use of the secondary battery for scavenging is curbed as much as possible and the second fuel cell is scavenged using the generated power of the first fuel cell, it is possible to sufficiently scavenge the first and second fuel cells.

The control device may be configured to perform the first scavenging process and then to perform the second scavenging process when an ignition is turned on.

The control device may be configured to perform the second scavenging process and then to perform the first scavenging process when the ignition is turned off.

The control device may be configured to perform the second scavenging process and not to perform the first scavenging process when the ignition is turned off and a state of charge of the secondary battery is less than a threshold value.

The control device may be configured to perform a third scavenging process of scavenging the second fuel cell using the charged power of the secondary battery while the first and second fuel cells are in the power generation stopped state, when the ignition is turned on after the second scavenging process has been performed and the first scavenging process has not been performed at the time of turning off the ignition. The control device may be configured to perform a fourth scavenging process of scavenging the first fuel cell using a generated power of the second fuel cell while the second fuel cell is in a power generation state and the first fuel cell is in the power generation stopped state, after the third scavenging process has been performed.

A power generation volume of the second fuel cell may be larger than a power generation volume of the first fuel cell, and the control device may be configured to set an amount of scavenging gas supplied to the second fuel cell to be greater than an amount of scavenging gas supplied to the first fuel cell.

It is possible to provide a fuel cell system that can satisfactorily scavenge a plurality of fuel cells.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a flowchart illustrating an example of scavenging control when an ignition is turned on;

FIG. 3 is a timing chart illustrating an example of scavenging control when an ignition is turned on;

FIG. 7 is a flowchart illustrating a modified example of scavenging control when an ignition is turned on;

DETAILED DESCRIPTION OF EMBODIMENTS

Configuration of Fuel Cell System

Figure 1:
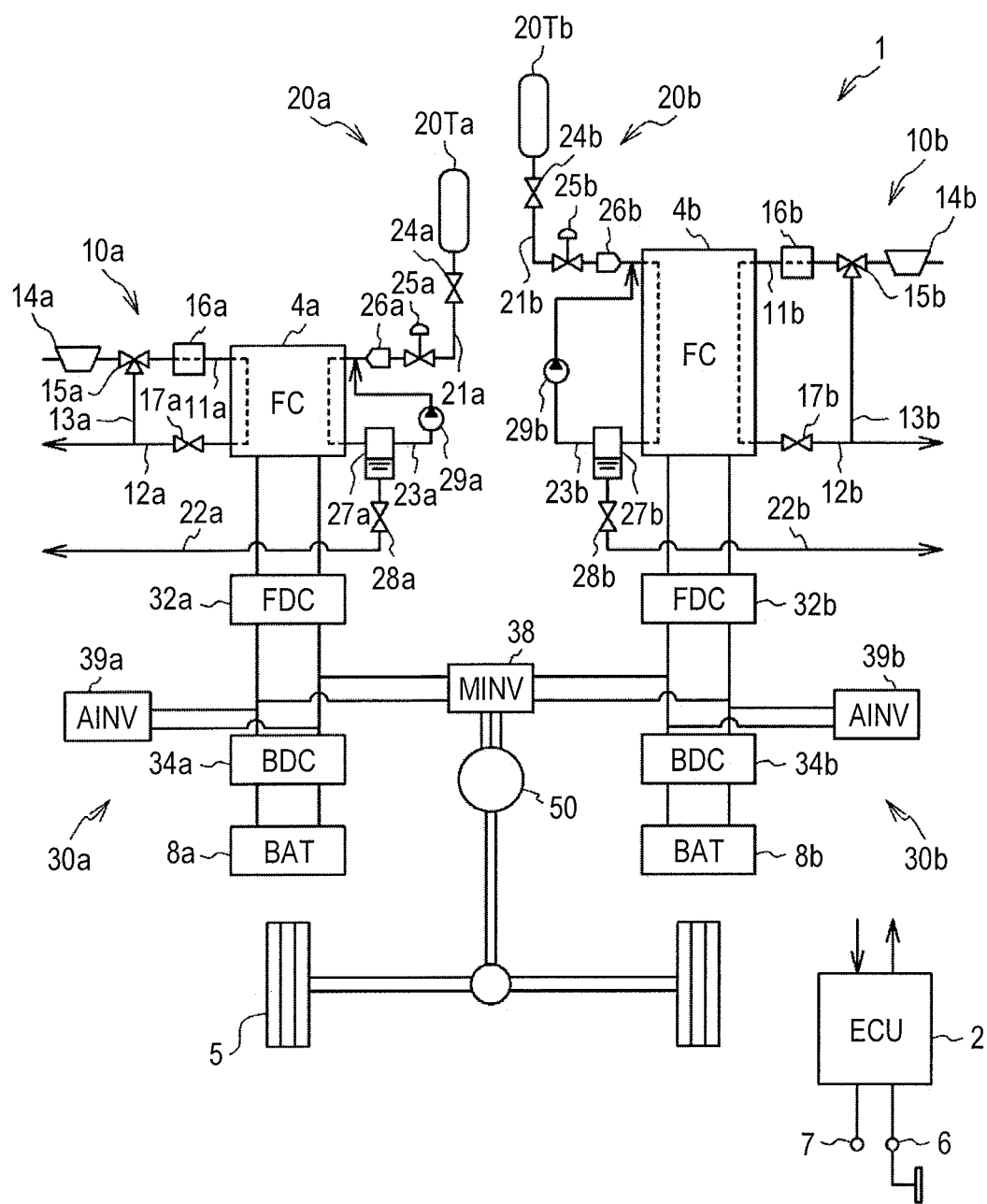
FIG. 1 is a diagram illustrating a configuration of a fuel cell system which is mounted in a vehicle.

FIG. 1 is a diagram illustrating a configuration of a fuel cell system (hereinafter simply referred to as a system) 1 which is mounted in a vehicle. The system 1 includes an electronic control unit (ECU) 2, fuel cells (hereinafter referred to as FCs) 4a and 4b, secondary batteries (hereinafter referred to as BATs) 8a and 8b, cathode gas supply systems 10a and 10b, anode gas supply systems 20a and 20b, power control systems 30a and 30b, and a motor 50. The system 1 includes a cooling system (not illustrated) that cools the FCs 4a and 4b by circulating a coolant in the FCs 4a and 4b.

The FCs 4a and 4b are fuel cells that are supplied with a cathode gas and an anode gas and generate electric power. In the FCs 4a and 4b, a plurality of unit cells of a solid polymer electrolyte type is stacked. In this embodiment, the FC 4b has a larger size and a greater rated power output than the FC 4a. Specifically, the same unit cells are stacked in the FCs 4a and 4b and the number of unit cells stacked in the FC 4b is greater than that in the FC 4a. Although details will be described later, the FC 4b has a larger power generation volume than the FC 4a. The FCs 4a and 4b are examples of first and second fuel cells, respectively.

The cathode gas supply systems 10a and 10b supply air including oxygen as a cathode gas to the FCs 4a and 4b, respectively. Specifically, the cathode gas supply systems 10a and 10b include supply pipes 11a and 11b, discharge pipes 12a and 12b, bypass pipes 13a and 13b, air compressors 14a and 14b, bypass valves 15a and 15b, intercoolers 16a and 16b, and backpressure valves 17a and 17b, respectively.

The supply pipes 11a and 11b are connected to cathode inlet manifolds of the FCs 4a and 4b, respectively. The discharge pipes 12a and 12b are connected to cathode outlet manifolds of the FCs 4a and 4b, respectively. The bypass pipe 13a causes the supply pipe 11a and the discharge pipe 12a to communicate with each other and, similarly, the bypass pipe 13b causes the supply pipe 11b and the discharge pipe 12b to communicate with each other. The bypass valve 15a is provided in a connection portion between the supply pipe 11a and the bypass pipe 13a and, similarly, the bypass valve 15b is provided in a connection portion between the supply pipe 11b and the bypass pipe 13b. The bypass valve 15a switches a communication state between the supply pipe 11a and the bypass pipe 13a and, similarly, the bypass valve 15b switches a communication state between the supply pipe 11b and the bypass pipe 13b. The air compressor 14a, the bypass valve 15a, and the intercooler 16a are sequentially arranged on the supply pipe 11a from the upstream side. The backpressure valve 17a is disposed on the discharge pipe 12a which is upstream from a connection portion between the discharge pipe 12a and the bypass pipe 13a. Similarly, the air compressor 14b, the bypass valve 15b, and the intercooler 16b are sequentially arranged on the supply pipe 11b from the upstream side. The backpressure valve 17b is disposed on the discharge pipe 12b which is upstream from a connection portion between the discharge pipe 12b and the bypass pipe 13b.

The air compressors 14a and 14b supply air including oxygen as a cathode gas to the FCs 4a and 4b via the supply pipes 11a and 11b, respectively. The cathode gases supplied to the FCs 4a and 4b are discharged via the discharge pipes 12a and 12b, respectively. The intercoolers 16a and 16b cool the cathode gases which are supplied to the FCs 4a and 4b, respectively. The backpressure valves 17a and 17b adjust back pressures on the cathode sides of the FCs 4a and 4b, respectively.

The anode gas supply systems 20a and 20b supply hydrogen gas as an anode gas to the FCs 4a and 4b, respectively. Specifically, the anode gas supply systems 20a and 20b include tanks 20Ta and 20Tb, supply pipes 21a and 21b, discharge pipes 22a and 22b, circulation pipes 23a and 23b, tank valves 24a and 24b, pressure regulating valves 25a and 25b, injectors (hereinafter referred to as INJs) 26a and 26b, gas-liquid separators 27a and 27b, drain valves 28a and 28b, and hydrogen circulation pumps (hereinafter referred to as HPs) 29a and 29b, respectively.

The tank 20Ta and an anode inlet manifold of the FC 4a are connected by the supply pipe 21a. Similarly, the tank 20Tb and an anode inlet manifold of the FC 4b are connected by the supply pipe 21b. Hydrogen gas which is an anode gas is stored in the tanks 20Ta and 20Tb. The discharge pipes 22a and 22b are connected to anode outlet manifolds of the FCs 4a and 4b, respectively. The circulation pipes 23a and 23b allow the gas-liquid separators 27a and 27b and the supply pipes 21a and 21b to communicate with each other. The tank valve 24a, the pressure regulating valve 25a, and the INJ 26a are sequentially arranged on the supply pipe 21a from the upstream side. In a state in which the tank valve 24a is open, a degree of opening of the pressure regulating valve 25a is adjusted and the INJ 26a injects the anode gas. Accordingly, the anode gas is supplied to the FC 4a. Driving of the tank valve 24a, the pressure regulating valve 25a, and the INJ 26a is controlled by the ECU 2. The same is true of the tank valve 24b, the pressure regulating valve 25b, and the INJ 26b.

In the discharge pipe 22a, the gas-liquid separator 27a and the drain valve 28a are sequentially arranged from the upstream side. The gas-liquid separator 27a separates moisture from the anode gas discharged from the FC 4a and stores the separated moisture. Water stored in the gas-liquid separator 27a is discharged to the outside of the system 1 via the discharge pipe 22a by opening the drain valve 28a. Driving of the drain valve 28a is controlled by the ECU 2. The same is true of the gas-liquid separator 27b and the drain valve 28b.

The circulation pipe 23a is a pipe for recirculating the anode gas to the FC 4a, and an upstream end thereof is connected to the gas-liquid separator 27a, and the HP 29a is disposed therein. The anode gas discharged from the FC 4a is appropriately pressurized by the HP 29a and is guided to the supply pipe 21a. Driving of the HP 29a is controlled by the ECU 2. The same is true of the circulation pipe 23b and the HP 29b.

The power control systems 30a and 30b include fuel cell DC/DC converters (hereinafter referred to as FDCs) 32a and 32b, battery DC/DC converters (hereinafter referred to as BDCs) 34a and 34b, and auxiliary machine inverters (hereinafter referred to as AINVs) 39a and 39b, respectively. The power control systems 30a and 30b share a motor inverter (hereinafter referred to as MINV) 38 which is connected to a motor 50. The FDCs 32a and the 32b adjust DC powers from the FCs 4a and 4b, respectively, and output the adjusted DC power to the MINV 38. The BDCs 34a and 34b adjust DC powers from the BATs 8a and 8b, respectively, and output the adjusted DC power to the MINV 38. Generated powers of the FCs 4a and 4b can be stored in the BATs 8a and 8b, respectively. The MINV 38 converts the input DC power into a three-phase AC power and supplies the AC power to the motor 50. The motor 50 drives vehicle wheels 5 to allow the vehicle to run.

Powers of the FC 4a and the BAT 8a can be supplied to load devices other than the motor 50 via the AINV 39a. Similarly, powers of the FC 4b and the BAT 8b can be supplied to load devices via the AINV 39b. Here, the load devices include auxiliary machines for the FCs 4a and 4b and auxiliary machines for the vehicle. The auxiliary machines for the FCs include the air compressors 14a and 14b, the bypass valves 15a and 15b, the backpressure valves 17a and 17b, the tank valves 24a and 24b, the pressure regulating valves 25a and 25b, the INJs 26a and 26b, the drain valves 28a and 28b, and the HPs 29a and 29b. The auxiliary machines for the vehicle include, for example, air-conditioning equipment, lighting equipment, and emergency lamps.

The ECU 2 includes a central processing unit (CPU), a read only memory (ROM), and a random access memory (RAM). The ECU 2 is electrically connected to an accelerator operation sensor 6, an ignition switch 7, the air compressors 14a and 14b, the bypass valves 15a and 15b, the backpressure valves 17a and 17b, the tank valves 24a and 24b, the pressure regulating valves 25a and 25b, the INJs 26a and 26b, the drain valves 28a and 28b, the FDCs 32a and 32b, and the BDCs 34a and 34b. The ECU 2 calculates a required power output for the FCs 4a and 4b as a whole based on a detected value from the accelerator operation sensor 6. The ECU 2 controls the auxiliary machines for the FCs 4a and 4b and the like based on the required power output and controls the total generated power of the FCs 4a and 4b.

Scavenging Control

The ECU 2 executes scavenging control for supplying a scavenging gas to the FCs 4a and 4b to scavenge the FCs 4a and 4b in order to discharge liquid water remaining in the FCs 4a and 4b when an ignition is turned on and when the ignition is turned off. By executing scavenging control when the ignition is turned on, it is possible to discharge liquid water remaining in the FCs 4a and 4b before starting power generation and to ensure an output performance at the time of subsequently starting power generation. By executing scavenging control when the ignition is turned off, it is possible to discharge liquid water generated by power generation from the FCs 4a and 4b and to prevent liquid water remaining in the FCs 4a and 4b from being frozen during stopping of the system 1. In the scavenging control according to this embodiment, anode gas passages which are formed in the FCs 4a and 4b are scavenged using the HPs 29a and 29b. The HP 29a and the HP 29b are examples of first and second scavenging devices that can scavenge the FCs 4a and 4b, respectively.

Scavenging Control when Ignition is Turned On

Figure 2:
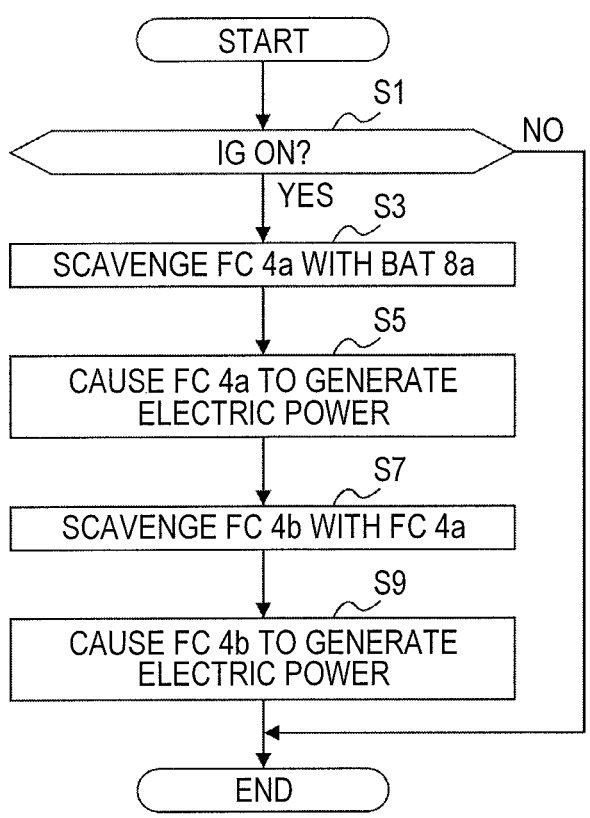
Figure 3:
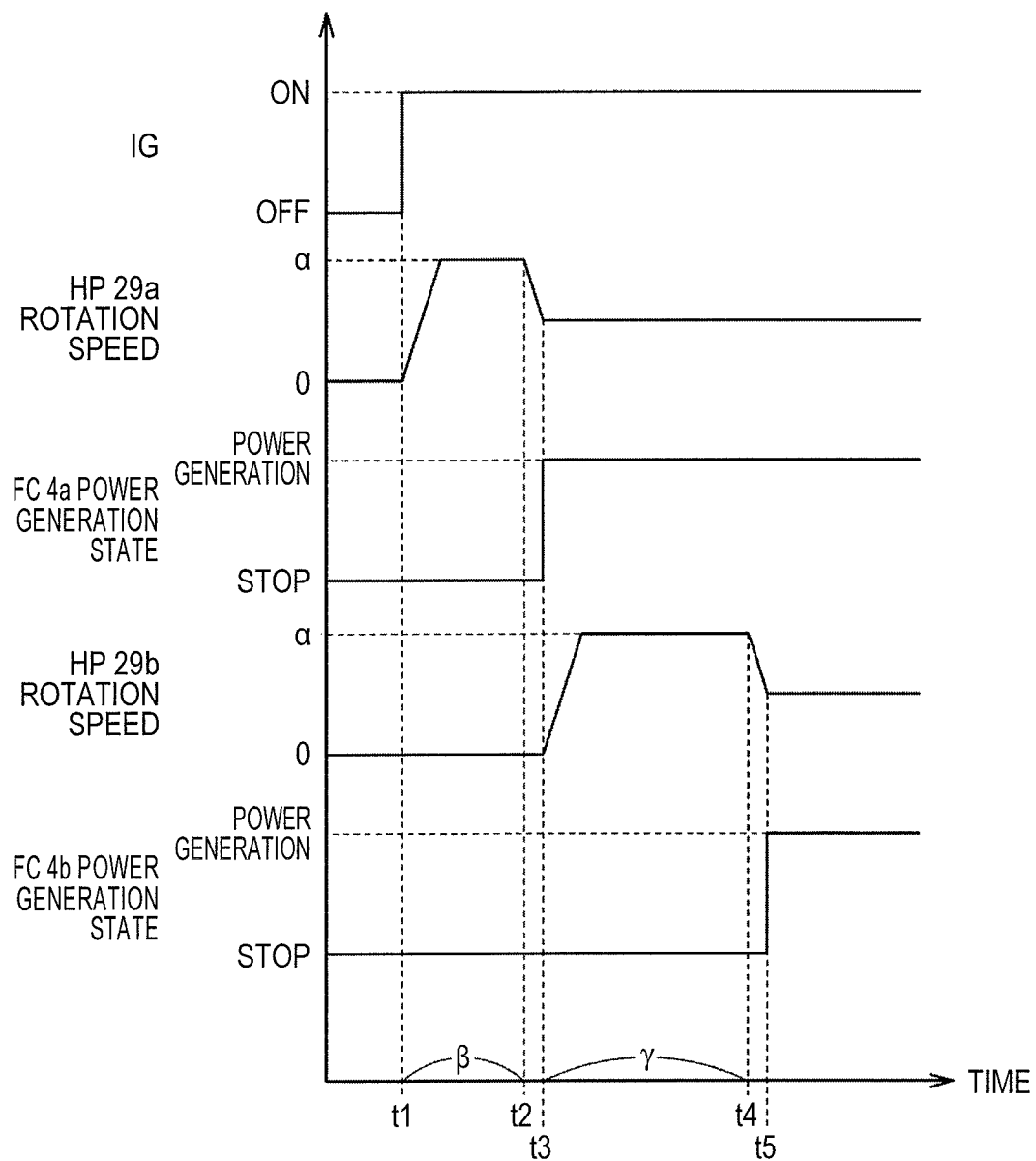

FIG. 2 is a flowchart illustrating an example of scavenging control when an ignition is turned on. FIG. 3 is a timing chart illustrating an example of scavenging control when the ignition is turned on. In FIG. 3, switching of the ignition between an ON state and an OFF state, rotation speeds of the HPs 29a and 29b, and power generation states of the FCs 4a and 4b are illustrated. This scavenging control is repeatedly executed at intervals of a predetermined period. In an OFF state of the ignition, the tank valves 24a and 24b and the drain valves 28a and 28b are closed.

The ECU 2 determines whether an ON state of the ignition has been detected based on an output signal from the ignition switch 7 (Step S1). When the determination result of step S1 is NO, this control ends. When the ON state of the ignition has been detected (YES in Step S1), the ECU 2 starts scavenging of the FC 4a by driving the HP 29a based on a charged power of the BAT 8a, that is, using the charged power of the BAT 8a (Step S3, time t1). For example, a gas remaining in the supply pipe 21a, the anode gas passage of the FC 4a, or the circulation pipe 23a is used as the scavenging gas. In scavenging conditions of the FC 4a, the rotation speed of the HP 29a is set to a speed $\alpha$ which suitable for scavenging of the FC 4a and a scavenging period is set to a period $\beta$. The speed $\alpha$ is, for example, 2000 rpm. The period $\beta$ is, for example, 15 seconds. Liquid water discharged from the FC 4a is stored in the gas-liquid separator 27a. The process of Step S3 is an example of a first scavenging process of scavenging the FC 4a by driving the HP 29a based on the charged power of the BAT 8a when the FCs 4a and 4b are in a power generation stopped state.

When scavenging of the FC 4a is completed at time t2 at which the period $\beta$ has elapsed from time t1, the ECU 2 starts power generation of the FC 4a (Step S5, time t3). Specifically, supply of the anode gas to the FC 4a is started by opening the tank valve 24a, the pressure regulating valve 25a, and the INJ 26a while continuously driving the HP 29a, supply of the cathode gas to the FC 4a is started by driving the air compressor 14a, and the FC 4a and the load devices are electrically connected to each other by a switch which is provided in the FDC 32a. In this embodiment, the rotation speed of the HP 29a when the FC 4a is in the power generation state is controlled such that it is a rotation speed corresponding to the required power output and is controlled such that it is a speed lower than the speed $\alpha$ at the time of scavenging in the example illustrated in FIG. 3. Drive power of the INJ 26a and the like at the time of starting of power generation of the FC 4a is supplied from the BAT 8a, but may be supplied from the FC 4a after a predetermined period has elapsed from the starting of power generation of the FC 4a.

The ECU 2 starts scavenging of the FC 4b by driving the HP 29b based on the generated power of the FC 4a, that is, using the generated power of the FC 4a (Step S7, time t3). Similarly to the case of the FC 4a, the gas remaining in the supply pipe 21b, the anode gas passage of the FC 4b, or the circulation pipe 23b is used as the scavenging gas. In the scavenging conditions of the FC 4b, the rotation speed of the HP 29b is set to the same speed $\alpha$ as in the HP 29a, and the scavenging period of the FC 4b is set to a period $\gamma$ which is longer than the period $\beta$ which is the scavenging period of the FC 4a. The period $\gamma$ is, for example, 30 seconds. The process of Step S7 is an example of a second scavenging process of scavenging the FC 4b by driving the HP 29b based on the generated power of the FC 4a when the FC 4a is in the power generation state and the FC 4b is in the power generation stopped state.

As described above, the FC 4b has a power generation volume greater than that of the FC 4a. A power generation volume is a value which is obtained by multiplying an electrode area of one unit cell sheet, an electrode thickness of one unit cell sheet, and the number of unit cells stacked. As the power generation volume becomes greater, the energy required for sufficiently performing scavenging becomes greater. This is because an amount of liquid water generated in the fuel cell becomes greater as the power generation volume becomes greater, and the energy required for sufficiently discharging the liquid water from the fuel cell becomes greater as the amount of liquid water becomes greater. In this embodiment, as described above, the rotation speeds of the HPs 29a and 29b are set to the speed $\alpha$ and the scavenging period of the FC 4b is longer than that of the FC 4a. Accordingly, the amount of scavenging gas supplied to the FC 4b is greater than that of the FC 4a, and the FC 4b uses more energy for scavenging than the FC 4a. In this way, both the FCs 4a and 4b can be sufficiently scavenged depending on the power generation volumes thereof.

When scavenging of the FC 4b has been completed (time t4), the ECU 2 starts power generation of the FC 4b (Step S9, time t5). Specifically, similarly to the case of the FC 4a, supply of the anode gas and the cathode gas to the FC 4b is started and the FC 4b and the load devices are electrically connected to each other.

Scavenging Control when Ignition is Turned Off

Figure 4:
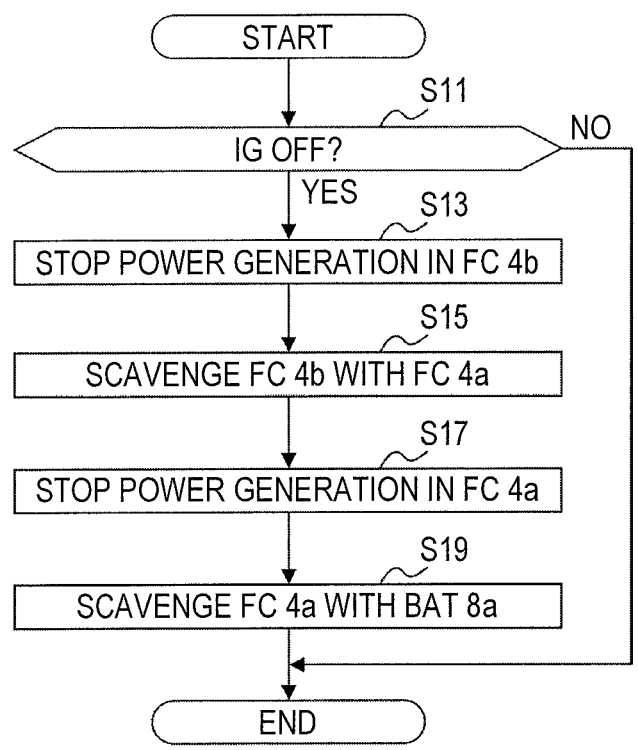
FIG. 4 is a flowchart illustrating an example of scavenging control when an ignition is turned off.
Figure 5:
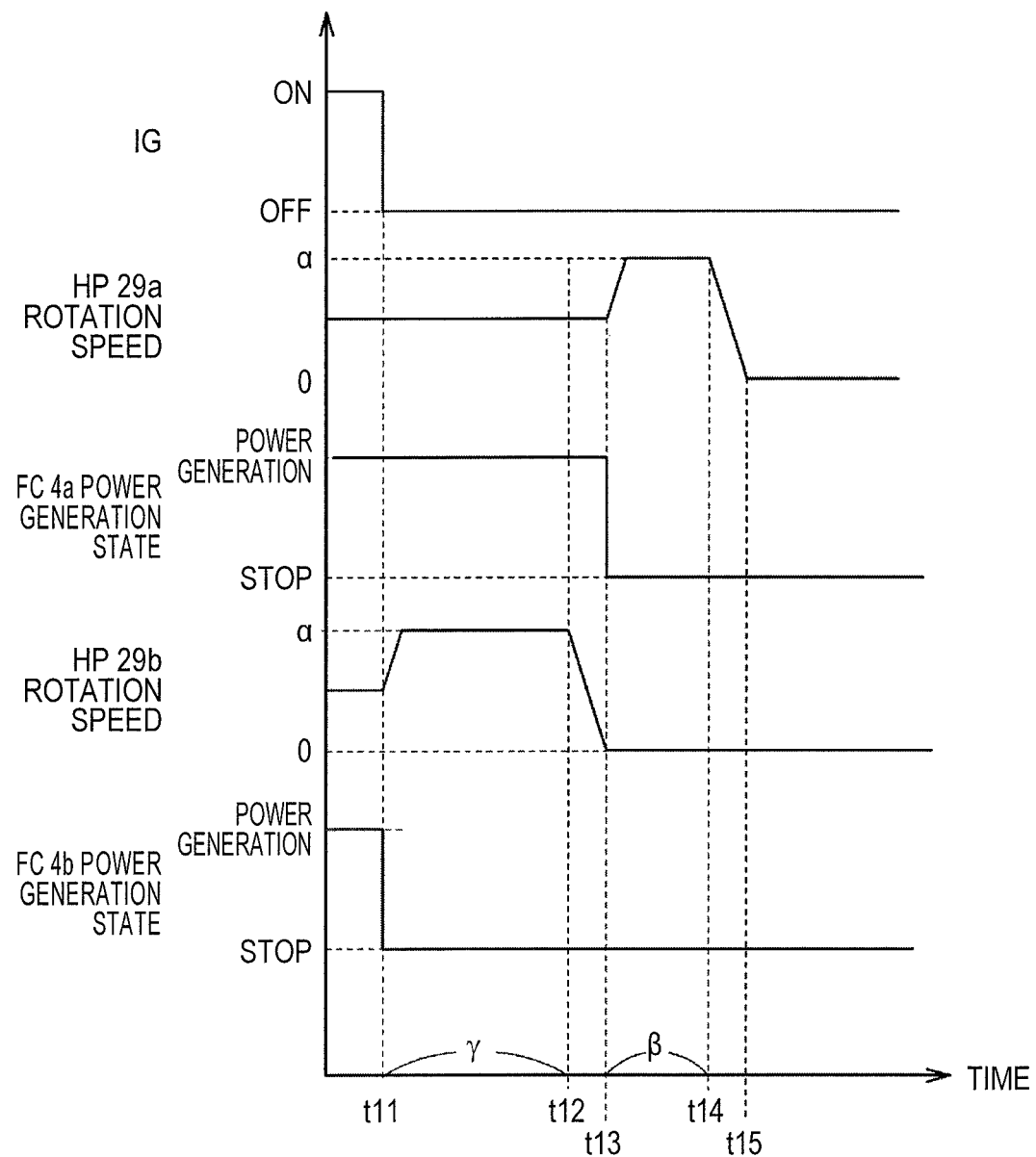
FIG. 5 is a timing chart illustrating an example of scavenging control when an ignition is turned off.

FIG. 4 is a flowchart illustrating an example of scavenging control when an ignition is turned off. FIG. 5 is a timing chart illustrating an example of scavenging control when the ignition is turned off. In FIG. 5, switching of the ignition between an ON state and an OFF state, the rotation speeds of the HPs 29a and 29b, and the power generation states of the FCs 4a and 4b are illustrated. This scavenging control is repeatedly executed at intervals of a predetermined period.

The ECU 2 determines whether an OFF state of the ignition has been detected based on the output signal from the ignition switch 7 (Step S11). When the determination result of step S11 is NO, this control ends. When the OFF state of the ignition has been detected (YES in Step S11), the ECU 2 stops power generation of the FC 4b (Step S13, time t11). Specifically, by electrically disconnecting the FC 4b and the load devices using a switch in the FDC 32b and closing the tank valve 24b and the pressure regulating valve 25b, driving of the INJ 26b and the air compressor 14b is stopped and supply of the anode gas and the cathode gas to the FC 4b is stopped. The ECU 2 starts scavenging of the FC 4b by continuously driving the HP 29b based on the generated power of the FC 4a (Step S15, time t11). Here, as described above, the rotation speed of the HP 29b is the speed α and the scavenging period of the FC 4b is also the same period γ. The process of Step S15 is an example of the second scavenging process.

The ECU 2 stops supply of the generated power from the FC 4a to the HP 29b (time t12) and scavenging of the FC 4b is completed. Then, the ECU 2 stops power generation of the FC 4a (Step S17, time t13). Specifically, similarly to the case of the FC 4b, the FC 4a is electrically disconnected from the load devices and supply of the anode gas and the cathode gas to the FC 4b is stopped. In addition, the ECU 2 starts scavenging of the FC 4a by continuously driving the HP 29a based on the charged power of the BAT 8a (Step S19, time t13). Here, as described above, the rotation speed of the HP 29a is the speed α and the scavenging period of the FC 4a is the period β. Then, scavenging of the FC 4a is completed (time t14), and the HP 29a is completely stopped (time t15). The process of Step S19 is an example of the first scavenging process.

As described above, in any case of a case in which the ignition is turned on and a case in which the ignition is turned off, the FC 4a is scavenged using the charged power of the BAT 8a, and the FC 4b is scavenged using the generated power of the FC 4a instead of the charged power of the BAT 8b. Accordingly, for example, when a state of charge of the BAT 8b is small and the FC 4b is scavenged using the BAT 8b, there is a likelihood that the FC 4b will not be able to be sufficiently scavenged. In this embodiment, this problem can be avoided and both the FCs 4a and 4b can be satisfactorily scavenged.

As described above, when both the FCs 4a and 4b are in the power generation stopped state, the FC 4a of which the power generation volume is less than that of the FC 4b is scavenged based on the charged power of the BAT 8a. For example, it is conceivable that the FC 4b having a large power generation volume be scavenged based on the charged power of the BAT 8b and the FC 4a having a small power generation volume be scavenged based on the generated power of the FC 4b. However, in this case, an amount of energy required for sufficiently scavenging the FC 4b is greater than an amount of energy required for sufficiently scavenging the FC 4a as described above. Accordingly, there is a likelihood that the FC 4b will not be able to be sufficiently scavenged depending on the state of charge of the BAT 8b. As described in this embodiment, the FC 4b can be sufficiently scavenged by scavenging the FC 4a using the charged power of the BAT 8a and scavenging the FC 4b using the generated power of the FC 4a.

In the above-mentioned embodiment, the FC 4b having the larger number of unit cells stacked than the FC 4a is described as an example of a second fuel cell having a larger power generation volume than a first fuel cell, but the disclosure is not limited thereto. For example, by setting the numbers of unit cells stacked in the first and second fuel cells to be the same and setting an electrode area of each unit cell in the second fuel cell to be larger than an electrode area of each unit cell in the first fuel cell, the second fuel cell may have a larger power generation volume than the first fuel cell. By setting the numbers of unit cells to be the same, setting the electrode areas of the unit cells thereof to be the same, and setting an electrode thickness of each unit cell in the second fuel cell to be larger than an electrode thickness of each unit cell in the first fuel cell, the second fuel cell may have a larger power generation volume than the first fuel cell. An electrode area is an area of a region in which an electrolyte membrane, an anode catalyst layer provided on one surface of the electrolyte membrane and a cathode catalyst layer provided on the other surface of the electrolyte membrane overlap each other. An electrode thickness is an average thickness of a region in which the electrolyte membrane, the anode catalyst layer, and the cathode catalyst layer overlap each other.

In the above-mentioned embodiment, since the rotation speeds of the HPs 29a and 29b in the scavenging conditions of the FCs 4a and 4b are the same and the scavenging period of the FC 4b is longer than that of the FC 4a, it is possible to cope with the FCs 4a and 4b having different power generation volumes, but the disclosure is not limited thereto. For example, the scavenging periods of the FCs 4a and 4b may be the same and the rotation speed of the HP 29b may be greater than the rotation speed of the HP 29a. Accordingly, an amount of scavenging gas supplied to the FC 4b becomes greater than an amount of scavenging gas supplied to the FC 4a.

In the above-mentioned embodiment, the FCs 4a and 4b are scavenged both when the ignition is turned on and when the ignition is turned off, but the FCs 4a and 4b may be scavenged at any one time thereof. The FC 4a may be scavenged by driving the HP 29a while injecting an anode gas using the INJ 26a. The same is true of the FC 4b.

Modified Example of Scavenging Control

Figure 6:
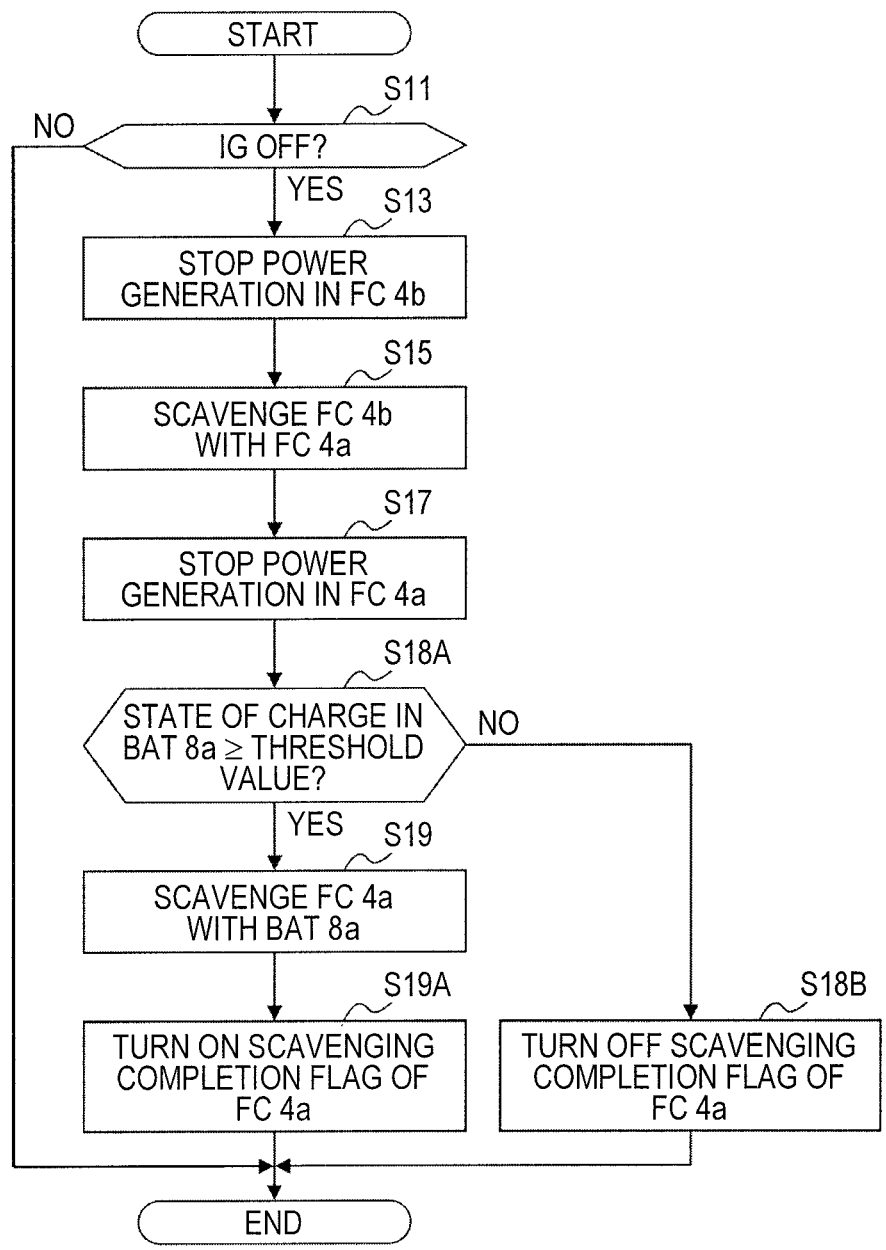
FIG. 6 is a flowchart illustrating a modified example of scavenging control when an ignition is turned off.
Figure 7:
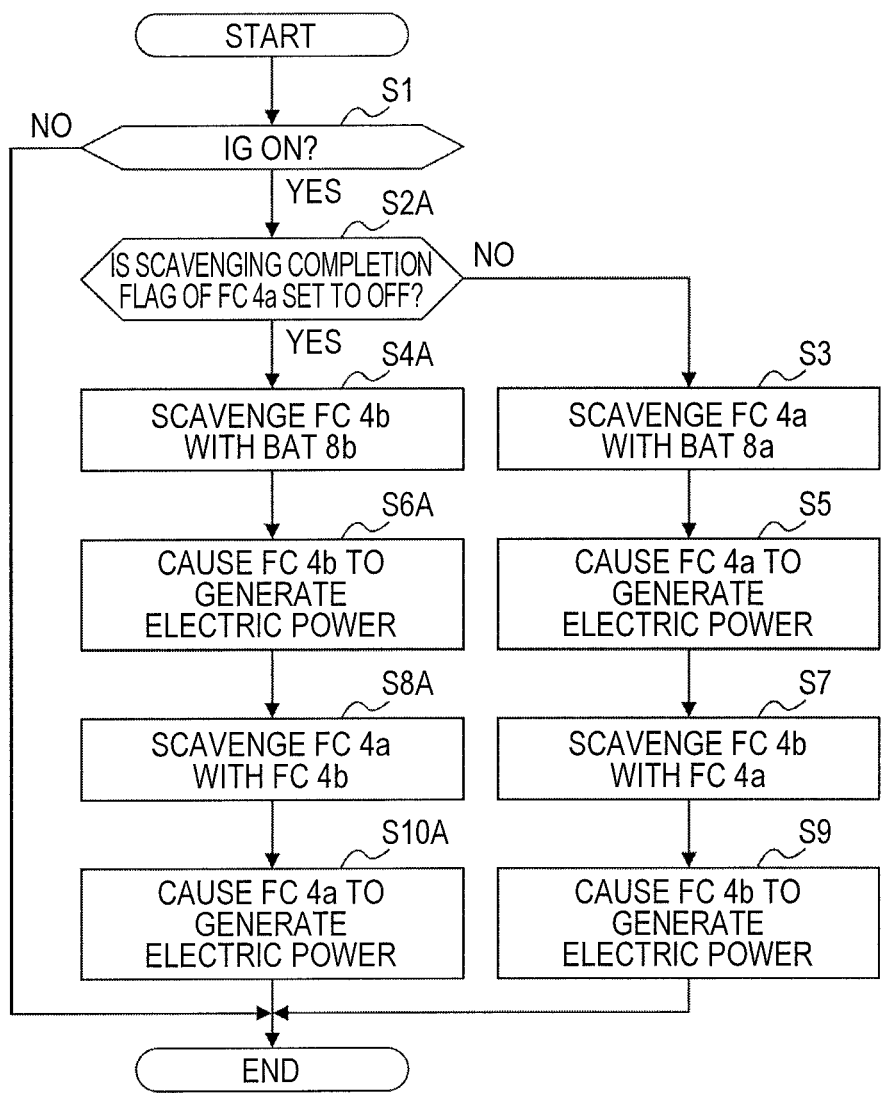

Modified examples of scavenging control will be described below. FIG. 6 is a flowchart illustrating a modified example of scavenging control when the ignition is turned off. FIG. 7 is a flowchart illustrating a modified example of scavenging control when the ignition is turned on. The same processes as in the above-mentioned embodiment will be referred to by the same reference signs and description thereof will not be repeated.

As illustrated in FIG. 6, when the determination result of Step S11 is YES and the processes of Steps S13, S15, and S17 are performed, the ECU 2 determines whether a state of charge of the BAT 8a is equal to or greater than a threshold value (Step S18A). Here, the threshold value is a value which is obtained by adding a predetermined margin to a total value of an amount of power required for scavenging the FC 4a when the ignition is turned off and an amount of power required for scavenging the FC 4a when the ignition is turned on, which will be described later. When the determination result of Step S18A is YES, the state of charge of BAT 8a is sufficiently large, the FC 4a is scavenged using the charged power of the BAT 8a similarly to the above-mentioned embodiment (Step S19), and the ECU 2 sets a scavenging completion flag of the FC 4a to ON (Step S19A). When the determination result of Step S18A is NO, the ECU 2 sets the scavenging completion flag of the FC 4a to OFF without scavenging the FC 4a (Step S18B) and this control ends.

As illustrated in FIG. 7, when the determination result of Step S1 is YES, the ECU 2 determines whether the scavenging completion flag of the FC 4a is set to OFF (Step S2A). When the determination result of Step S2A is NO, that is, when the determination result of Step S18 in FIG. 6 is YES and scavenging of the FC 4a is being performed, the processes of Steps S3, S5, S7, and S9 are performed similarly to the above-mentioned embodiment. That is, even when the ignition is turned on, the FC 4a is scavenged using the charged power of the BAT 8a and the FC 4b is scavenged using the generated power of the FC 4a.

When the determination result of Step S2A is YES, the ECU 2 scavenges the FC 4b by driving the HP 29b based on the charged power of the BAT 8b unlike Step S3 (Step S4A). The process of Step S4A is an example of a third scavenging process of scavenging the FC 4b based on the charged power of the BAT 8b in a state in which power generation of the FCs 4a and 4b is stopped when the ignition is turned on after the second scavenging process has been performed and the first scavenging process has not been performed when the ignition has been turned off.

Then, the ECU 2 causes the FC 4b to generate electric power (Step S6A) and scavenges the FC 4a by driving the HP 29a based on the generated power of the FC 4b (Step S8A). Thereafter, the ECU 2 causes the FC 4a to generate electric power (Step S10A). The process of Step S6A is an example of a fourth scavenging process of scavenging the FC 4a based on the generated power of the FC 4b when the FC 4b is in the power generation state and the FC 4a is in the power generation stopped state after the third scavenging process has been performed.

In this way, when the FC 4a has not been scavenged and only the FC 4b has been scavenged when the ignition has been turned off, the FC 4b is scavenged earlier than the FC 4a when the ignition is turned on. The reason is as follows. Since the FC 4a has not been scavenged when the ignition is turned off, there is a likelihood that liquid water will have remained in the FC 4a. Even when the FC 4a is scavenged and starts power generation earlier than the FC 4b when the ignition is turned on in this state, the FC 4a has not been scavenged when the ignition has previously turned off, and thus there is a likelihood that liquid water in the FC 4a will not be able to be discharged by only scavenging when the ignition is turned on. Accordingly, there is a likelihood that power generation performance immediately after power generation of the FC 4a has been started will decrease and responsiveness to a required power output will decrease. By earlier starting scavenging and power generation of the FC 4b which has been scavenged when the ignition has been turned off, when the ignition is turned on, as in this embodiment, responsiveness to a required power output immediately after power generation of the FC 4b has been started is ensured.

Modified Example of Fuel Cell System

Figure 8:
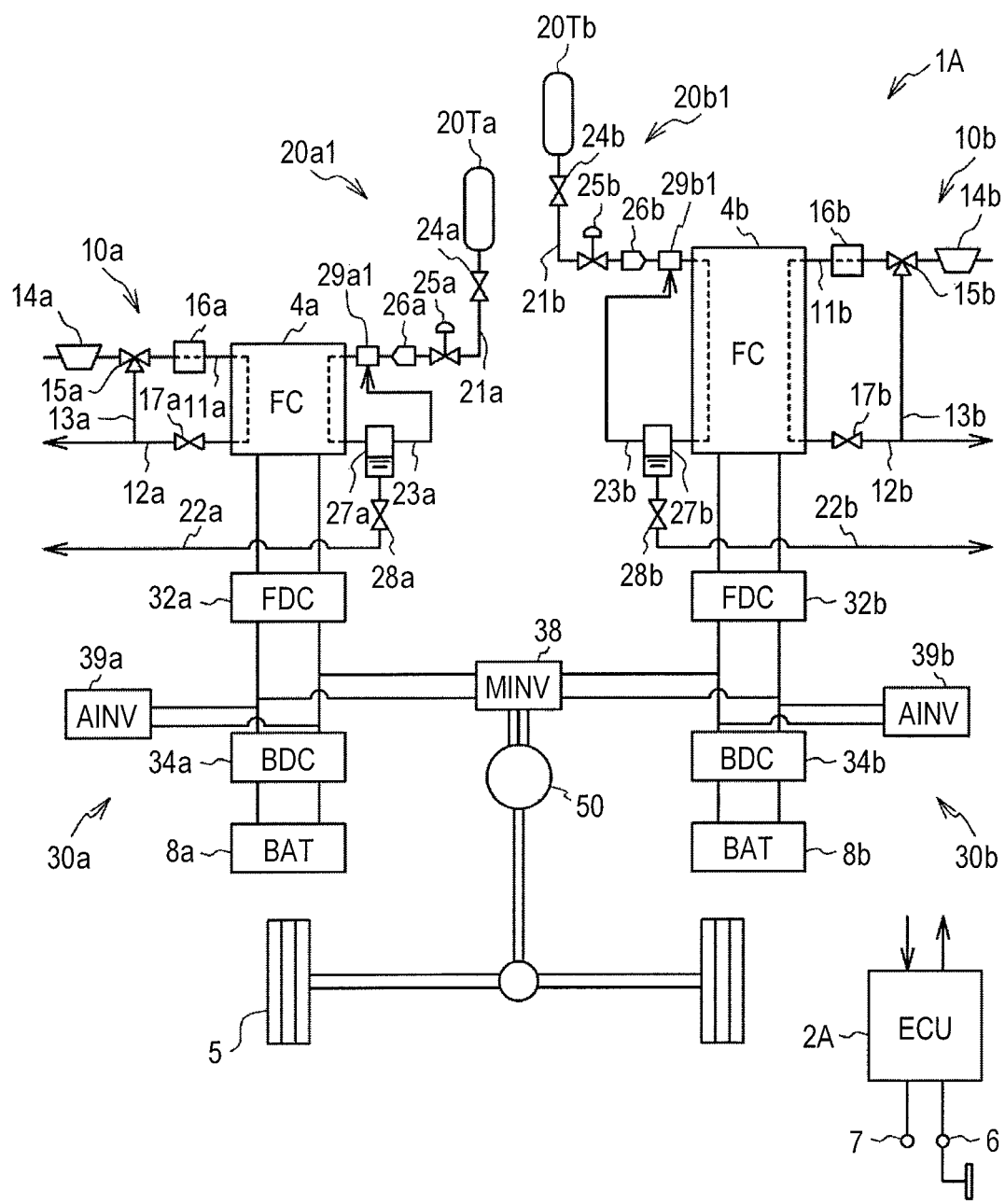
FIG. 8 is a diagram illustrating a configuration of a system according to a modified example.

FIG. 8 is a diagram illustrating a configuration of a system 1A according to a modified example. In this modified example, anode gas supply systems 20a1 and 20b1 include ejectors 29a1 and 29b1 instead of the HPs 29a and 29b, respectively, unlike the above-mentioned embodiment. The ejectors 29a1 and 29b1 are provided on the supply pipes 21a and 21b which are downstream from the INJs 26a and 26b. The ejector 29a1 uses a flow of an anode gas injected from the INJ 26a as a driving flow, takes an anode gas, which is discharged from the FC 4a, in from the circulation pipe 23a, and circulates the anode gas discharged from the FC 4a to the FC 4a again. The same is true of the ejector 29b1. In scavenging control of the system 1A, the anode gas injected from the INJs 26a and 26b is used as a scavenging gas. Accordingly, the INJs 26a and 26b are examples of first and second scavenging devices, respectively.

Scavenging Control in Modified Example of Fuel Cell System

Figure 9:
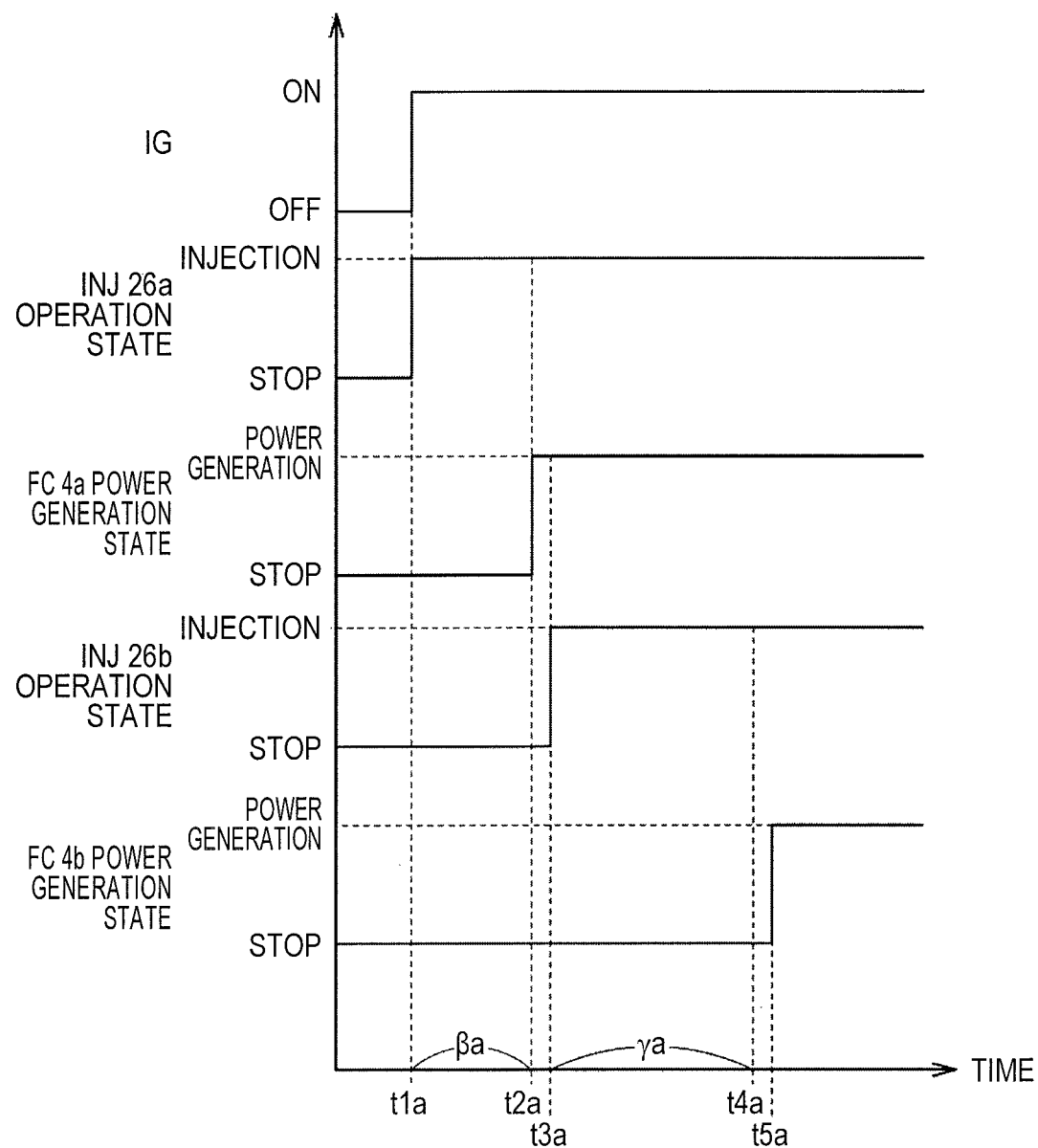
FIG. 9 is a timing chart illustrating an example of scavenging control when an ignition is turned on in a system according to a modified example.

FIG. 9 is a timing chart illustrating an example of scavenging control when the ignition is turned on in the system 1A according to the modified example. In FIG. 9, switching of the ignition between an ON state and an OFF state, operation states of the INJs 26a and 26b, and power generation states of the FCs 4a and 4b are illustrated. When the ignition is switched to ON, the ECU 2A starts scavenging of the FC 4a by driving the INJ 26a based on the charged power of the BAT 8a (time t1a). Here, a scavenging period which is a period in which the INJ 26a is open to supply an anode gas to the FC 4a is set to a period βa. When scavenging of the FC 4a is completed (time t2a), the ECU 2A starts power generation of the FC 4a while continuously injecting an anode gas from the INJ 26a (time t2a). The ECU 2A starts scavenging of the FC 4b by driving the INJ 26b based on the generated power of the FC 4a (time t3a). Here, a scavenging period which is a period in which the INJ 26b is open to scavenge the FC 4b is set to a period γ a which is longer than the period βa. When scavenging of the FC 4b is completed (time t4a), the ECU 2A starts power generation of the FC 4b while continuously injecting an anode gas from the INJ 26b (time t5a).

Figure 10:
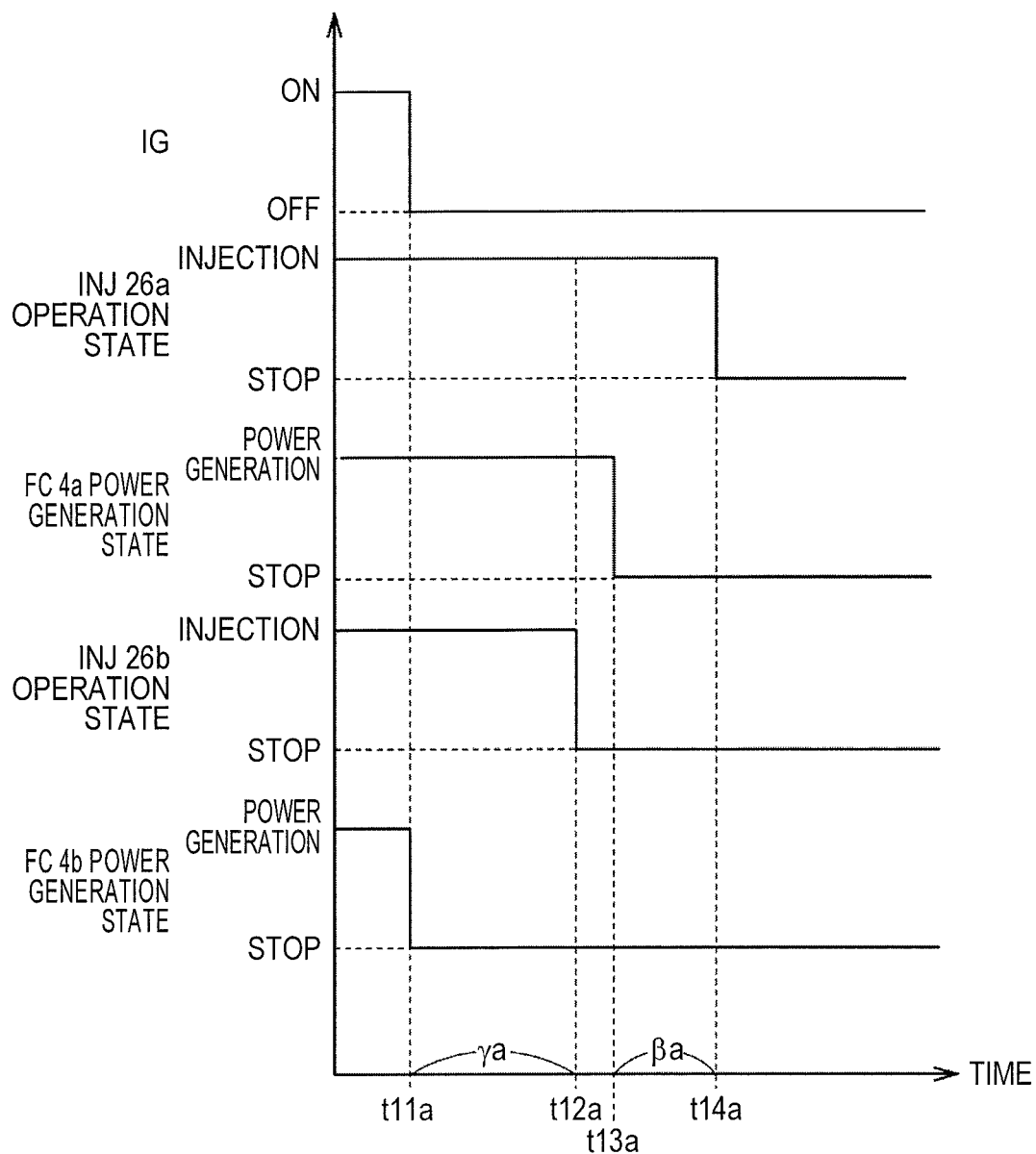
FIG. 10 is a timing chart illustrating an example of scavenging control when an ignition is turned off in a system according to a modified example.

FIG. 10 is a timing chart illustrating an example of scavenging control when the ignition is turned off in the system 1A according to the modified example. In FIG. 10, switching of the ignition between an ON state and an OFF state, operation states of the INJs 26a and 26b, and power generation states of the FCs 4a and 4b are illustrated. When the ignition is switched to OFF, the ECU 2A stops power generation of the FC 4b and starts scavenging of the FC 4b by driving the INJ 26b based on the generated power of the FC 4a to inject an anode gas (time t11a). The scavenging period of the FC 4b is set to the period γ a similarly to the above-mentioned case. Then, the ECU 2A stops the INJ 26b and completes scavenging of the FC 4b (time t12a), and then stops power generation of the FC 4a and starts scavenging of the FC 4a by driving the INJ 26a based on the charged power of the BAT 8a to inject an anode gas (time t13a). The scavenging period of the FC 4a is set to the period βa similarly to the above-mentioned case. Then, the ECU 2A stops the INJ 26a and completes scavenging of the FC 4a (time t14a).

As described above, in the system 1A not including the HPs 29a and 29b but including the ejectors 29a1 and 29b1, it is also possible to satisfactorily scavenge both the FCs 4a and 4b using the INJs 26a and 26b. In the system 1A, scavenging is performed using the anode gas injected from the INJs 26a and 26b when the ignition is turned on, and power generation of the FCs 4a and 4b is started using the anode gas which has been used for scavenging after the scavenging has been completed. Accordingly, power generation of the FCs 4a and 4b can be started in a relatively short time after scavenging has been completed. Accordingly, power generation of the FC 4a can be started in a short time after scavenging of the FC 4a has been completed, and scavenging of the FC 4b can be started in a short time based on the generated power thereof. Accordingly, it is possible to shorten a period from a time at which the ignition is switched to ON to a time at which scavenging of both the FCs 4a and 4b is completed and power generation is started and to improve responsiveness to a required power output.

In scavenging control of the system 1A, opening and closing of the INJs 26a and 26b may be intermittently performed. In this case, control may be performed such that a total valve-open period of the INJ 26b at the time of scavenging the FC 4b is longer than a total valve-open period of the INJ 26a at the time of scavenging the FC 4a by changing a duty ratio of opening and closing. In this case, the amount of anode gas supplied as a scavenging gas to the FC 4b is larger than the amount of anode gas supplied as a scavenging gas to the FC 4a and both the FCs 4a and 4b can be satisfactorily scavenged. By adjusting the degrees of opening of the pressure regulating valves 25a and 25b such that the pressure of the anode gas injected from the INJ 26b is greater than the pressure of the anode gas injected from the INJ 26a, the amount of anode gas supplied as a scavenging gas to the FC 4b may be set to be greater than the amount of anode gas supplied as a scavenging gas to the FC 4a even when the total valve-open periods of the INJs 26a and 26b are the same. In the system 1A, the FCs 4a and 4b may also be scavenged at any one of the time at which the ignition is turned on and the time at which the ignition is turned off. In the system 1A, the modified example of scavenging control illustrated in FIGS. 6 and 7 may be employed.

Others

In the embodiment and the modified examples, the power generation volume of the FC 4b is greater than that of the FC 4a, but the disclosure is not limited thereto and the power generation volumes may be the same. In this case, the amounts of scavenging gas supplied to the FCs 4a and 4b are preferably the same. That is, in the above-mentioned embodiment, the scavenging periods of the FCs 4a and 4b or the rotation speeds of the HPs 29a and 29b may be the same, and the total valve-open periods of the INJs 26a and 26b in scavenging control of the system 1A may be the same.

In the above-mentioned embodiment, two FCs 4a and 4b are provided, but three or more FCs may be provided. For example, in a system including a third fuel cell in addition to the FCs 4a and 4b, when the ignition is turned on, scavenging of the third fuel cell is preferably performed based on the generated power of at least one of the FCs 4a and 4b without using the charged power of the secondary battery after scavenging of the FCs 4a and 4b has been performed as illustrated in FIG. 2. Similarly, when the ignition is turned off, it is preferable that power generation of the third fuel cell be stopped earlier before power generation of the FCs 4a and 4b is stopped, the third fuel cell be scavenged using the generated power of at least one of the FCs 4a and 4b, and then the FCs 4a and 4b be scavenged as illustrated in FIG. 4. This is because the third fuel cell can be satisfactorily scavenged by scavenging the third fuel cell without using the charged power of the secondary battery.

In the above-mentioned embodiment, the BATs 8a and 8b corresponding to the FCs 4a and 4b are provided, but the disclosure is not limited thereto and a secondary battery which is common to the FCs 4a and 4b may be provided. In the above-mentioned embodiment, the tanks 20Ta and 20Tb corresponding to the FCs 4a and 4b are provided, but the disclosure is not limited thereto and a tank which is common to the FCs 4a and 4b may be provided instead of the tanks 20Ta and 20Tb or three or more tanks may be provided.

In the above-mentioned embodiment, only the anode sides of the FCs 4a and 4b are scavenged, but only the cathode sides thereof may be scavenged or both the anode sides and the cathode sides may be scavenged. Scavenging of the cathode side of the FC 4a is preferably performed by adjusting the degree of opening of the backpressure valve 17a while cutting off the communication state between the supply pipe 11a and the bypass pipe 13a using the bypass valve 15a and driving the air compressor 14a. The same is true of the FC 4b. In order to cope with the FC 4b having a larger power generation volume than the FC 4a, similarly to the above-mentioned embodiment, a scavenging period in the air compressor 14b may be set to be longer than that in the air compressor 14a while setting the rotation speeds of the air compressors 14a and 14b to be the same or the rotation speed of the air compressor 14b may be set to be higher than that of the air compressor 14a while setting the scavenging periods to be the same.

The vehicle in which the fuel cell system is mounted is not limited to an automobile and may be a vehicle with two wheels, a railway vehicle, a ship, or an aircraft or may be a hybrid vehicle that can use a motor and an internal combustion engine to drive the vehicle.

While exemplary embodiments of the disclosure have been described above in detail, the disclosure is not limited to any specific embodiment and can be modified in various forms without departing from the gist of the disclosure.

What is claimed is:

1. A fuel cell system comprising:
   a secondary battery;
   first and second fuel cells;
   first and second scavenging devices configured to scavenge the first and second fuel cells, respectively; and
   a control device configured to perform a first scavenging process of scavenging the first fuel cell by driving the first scavenging device using a charged power of the secondary battery when the first and second fuel cells are in a power generation stopped state and to perform a second scavenging process of scavenging the second fuel cell by driving the second scavenging device using a generated power of the first fuel cell when the first fuel cell is in a power generation state and the second fuel cell is in the power generation stopped state,
   wherein a power generation volume of the second fuel cell is larger than a power generation volume of the first fuel cell, and
   wherein the control device is configured to set an amount of scavenging gas supplied to the second fuel cell to be greater than an amount of scavenging gas supplied to the first fuel cell.

2. The fuel cell system according to claim 1, wherein the control device is configured to perform the first scavenging process and then to perform the second scavenging process when an ignition is turned on.

3. The fuel cell system according to claim 1, wherein the control device is configured to perform the second scavenging process and then to perform the first scavenging process when an ignition is turned off.

4. The fuel cell system according to claim 1, wherein the control device is configured to perform the second scavenging process and not to perform the first scavenging process when an ignition is turned off and a state of charge of the secondary battery is less than a threshold value.

5. The fuel cell system according to claim 4, wherein the control device is configured
   to perform a third scavenging process of scavenging the second fuel cell using the charged power of the secondary battery while the first and second fuel cells are in the power generation stopped state, when the ignition is turned on after the second scavenging process has been performed and the first scavenging process has not been performed at a time of turning off the ignition, and to perform a fourth scavenging process of scavenging the first fuel cell using a generated power of the second fuel cell while the second fuel cell is in the power generation state and the first fuel cell is in the power generation stopped state, after the third scavenging process has been performed.

\* \* \* \* \*